No. 743,071.       Patented November 3, 1903.

UNITED STATES PATENT OFFICE.

RICHARD GLEY AND OTTO SIEBERT, OF BERLIN, GERMANY, ASSIGNORS TO ACTIEN GESELLSCHAFT FÜR ANILIN FABRIKATION, OF BERLIN, GERMANY.

MONOAZO DYE AND PROCESS OF MAKING SAME.

SPECIFICATION forming part of Letters Patent No. 743,071, dated November 3, 1903.

Application filed March 26, 1903. Serial No. 149,736. (Specimens.)

*To all whom it may concern:*

Be it known that we, RICHARD GLEY and OTTO SIEBERT, of Berlin, in the Kingdom of Prussia, German Empire, have invented new and useful Improvements in the Production of Monoazo Dye and Process of Making Same; and we do hereby declare that the following is a full, clear, and exact description of the invention, which will enable others skilled in the art to which it appertains to make and use the same.

Our invention relates to the manufacture of an azo dyestuff which is obtained by combining the diazo compound of the following sulfo-acid:

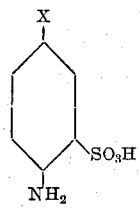

in which X represents $NO_2$, Cl, or $CH_3$, with beta-oxynaphthoic acid. The coloring-matters thus obtained are most suitable for the preparation of red lakes which are distinguished by their brilliant color and their fastness against the action of water, oil, and light. These lakes therefore are extremely fit for use as printing-lakes in lithography and for similar purposes.

The new azo dyes even in the form of their alkali salts are only slightly soluble in water and may easily be converted into completely insoluble compounds by preparing other metal salts of them. Our new dyes are soluble in concentrated sulfuric acid with a violet-red color.

The manufacture of our dyestuff is illustrated by the following example: Dissolve 18.7 parts of para-toluidin sulfo-acid with 11.4 parts of caustic-soda lye containing thirty-five per cent. NaOH in water and add a solution of 6.9 parts of sodium nitrite. Run this solution into 4.5 parts of hydrochloric acid (containing thirty-two per cent. HCl) mixed with ice. After stirring for some time the formation of the diazo compound is completed. Then pour the diazo compound into a solution of 18.8 parts of beta-oxynaphthoic acid and 36.5 parts of soda in water. The combination takes place almost immediately. Hereafter heat the mixture to about 80°, add some common salt, and filter. It is advantageous to use the dyestuff in the form of a paste. The dried dyestuff is a red powder with a metallic luster.

In the preceding example the para-toluidin sulfo-acid may be substituted by para-nitranilin sulfo-acid or by para-chloranilin sulfo-acid without essentially changing the result.

Having now described our invention and in what manner the same is to be performed, what we claim is—

1. The herein-described process of producing a red azo dye by combining the diazo compound of the following sulfo-acid:

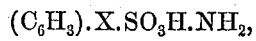

in which X represents $NO_2$, Cl or $CH_3$, with beta-oxynaphthoic acid, substantially as described.

2. As a new product the azo dyestuff obtained by combining the para-substituted diazobenzene-ortho-sulfonic acid with beta₁, beta₂-oxynaphthoic acid, being when dried a red powder, slightly soluble in water and soluble with a violet-red color in concentrated sulfuric acid and capable of forming brilliant red lakes, distinguished by their fastness, substantially as set forth.

In witness whereof we have hereunto signed our names, this 10th day of March, 1903, in the presence of two subscribing witnesses.

RICHARD GLEY.
OTTO SIEBERT.

Witnesses:
　WOLDEMAR HAUPT,
　HENRY HASPER.